UNITED STATES PATENT OFFICE.

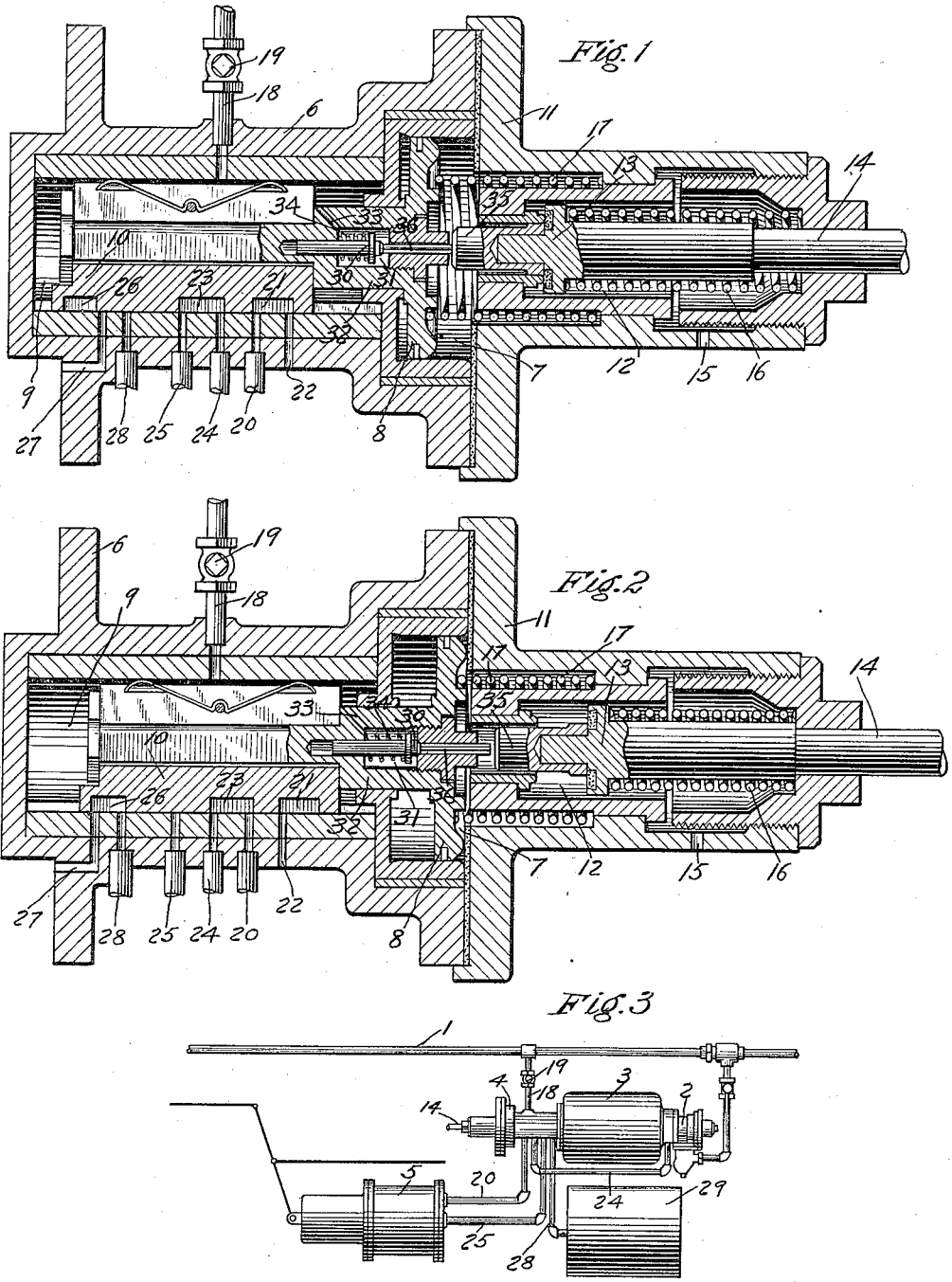

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

EMPTY AND LOAD BRAKE.

1,075,389.  Specification of Letters Patent.  Patented Oct. 14, 1913.

Application filed February 14, 1912. Serial No. 677,612.

*To all whom it may concern:*

Be it known that I, WALTER V. TURNER, a citizen of the United States, residing at Edgewood, in the county of Allegheny and State of Pennsylvania, have invented new and useful Improvements in Empty and Load Brakes, of which the following is a specification.

This invention relates to fluid pressure brakes, and more particularly to an empty and load brake apparatus, the present invention being in the nature of an improvement on certain features covered in my prior application Serial No. 590,927, filed November 5, 1910.

In the accompanying drawing; Figure 1 is a central sectional view of an empty and load valve mechanism embodying my invention, showing the parts in empty position, Fig. 2 a similar view, showing the parts in load position; and Fig. 3 a diagrammatic view of a car air brake equipment with my improvement applied thereto.

While my improvement is not limited in its application to any particular form of empty and load brake apparatus, the same is shown applied to a car air brake apparatus comprising a train pipe 1, connected to triple valve device 2, auxiliary reservoir 3, empty and load valve mechanism 4, and duplex brake cylinder 5.

The empty and load valve mechanism may comprise a casing 6, having a piston chamber 7 containing a piston 8, and a valve chamber 9 containing a slide valve 10 adapted to be operated by the piston 8. Preferably in the piston chamber cap 11 is provided a valve chamber 12 containing a seating valve 13 adapted to be actuated by a stem or rod 14 which may be shifted manually by the usual hand levers (not shown). The valve 13 controls communication from piston chamber 7 to valve chamber 12 which is open to the atmosphere through a port 15 and the valve is subject to the pressure of a spring 16 tending to seat the same. The piston 8 is subject on its outer face to the pressure of a spring 17 and the valve chamber 9 is connected to the train pipe 1 by a pipe 18 containing a check valve 19 for preventing flow of fluid under pressure from the valve chamber to the train pipe.

In the empty position of the valve mechanism, as shown in Fig. 1, the slide valve 10 is adapted to connect pipe 20 leading to the load brake cylinder through cavity 21 with an exhaust port 22 and a cavity 23 in the slide valve also connects pipe 24, leading from the triple valve device 2, with the empty car brake cylinder pipe 25. In the load position, as shown in Fig. 2, cavity 23 in slide valve 10 connects the triple valve supply pipe 24 with the load brake cylinder pipe 20 and a cavity 26 connects passage 27 leading to the auxiliary reservoir 3 with a pipe 28 leading to an additional reservoir 29.

An empty and load valve mechanism similar to that above described is covered in my prior application Serial No. 590,927, hereinbefore referred to, and in this prior construction there is a feed groove provided which is open in the release position of the piston, corresponding with the piston 8 of the present construction. This feed groove is for the purpose of permitting fluid to equalize from the valve chamber on one side of the piston to the chamber on the opposite side thereof, so that the opposing fluid pressures being normally balanced, the piston spring maintains the piston and the slide valve in the empty position.

With the prior construction, if the manually operated lever is in load position and the pressure in the brake system is reduced to a low degree, the piston is moved to its empty position, in which the feed groove is opened. If the train pipe pressure is now increased, fluid can leak through the feed groove around the piston and escape to the atmosphere until there is a sufficient increase in train pipe pressure to overcome the resistance of the piston spring and shift the piston to load position. Thus considerable fluid may be wasted, particularly on long trains, where the rate of increase in train pipe pressure is liable to be slow. In order to obviate this difficulty and prevent leakage and waste of fluid under pressure, according to my present improvement, the feed groove is dispensed with, and instead, a puppet valve 30 is provided in a chamber 31 contained in the central portion of the piston stem 32. Said valve is adapted to control communication from valve chamber 9 through a port 33 to piston chamber 7 and a spring 34 tends to seat the valve.

A stem 35 projecting from the valve 13 is adapted to engage the valve stem 36 of the valve 30 in the movement of the valve 13 to the empty position and thereby lift the valve 30 from its seat.

In operation, when the manually operated rod 14 is set to empty position, the stem 35 engages the valve stem 36 and maintains the valve 30 off its seat, so that fluid under pressure is free to equalize on opposite sides of the piston 8, and thus accomplishes the purpose of the feed groove of the prior construction, but if the rod 14 is adjusted to the load position, the stem 35 is moved out of engagement with the valve stem 36 so that the valve 30 is moved to its seat by the spring 34, thus closing communication from the valve chamber 9 to the piston chamber 7, as shown in Fig. 2. It will now be evident that if the train pipe pressure should be reduced low enough to cause the piston 8 to shift to the empty position, while the rod 14 and valve 13 are in the load position, the valve 30 would remain seated and consequently when the train pipe pressure is increased, there will be no leakage of fluid from the valve chamber 9 and thus waste of fluid is prevented.

Having now described my invention, what I claim as new and desire to secure by Letters Patent, is:—

1. In an empty and load brake, the combination with a valve mechanism having positions for empty and load braking and subject on one side to fluid under pressure, of a manually operated device for effecting the movement of said valve mechanism to its different positions and means controlled by said device for equalizing the fluid pressures on opposite sides of said valve mechanism.

2. In an empty and load brake, the combination with a valve having positions for empty and load braking and a piston subject on one side to fluid under pressure for operating said valve, of a manually operated device for controlling the operation of said piston and a valve operated by said device for controlling the equalization of fluid under pressure to the opposite side of said piston.

3. In an empty and load brake, the combination with a valve having positions for empty and load braking, a piston subject on one side to fluid under pressure for operating said valve, and an equalizing valve for controlling communication from one side of the piston to the opposite side, of a manually operated device for controlling the operation of said piston and adapted in the empty position to maintain said equalizing valve open.

4. In an empty and load brake, the combination with a valve having positions for empty and load braking, a piston subject on one side to fluid under pressure for operating said valve, and an equalizing valve for controlling communication from one side of the piston to the opposite side, of a manually operated device for controlling the operation of said piston and adapted in the empty position to maintain said equalizing valve open and in the load position to permit said valve to close.

5. In an empty and load brake, the combination with a valve having a position for empty and a position for load braking, a piston, subject on one side to fluid under pressure and on the opposite side to the pressure of a chamber, for operating said valve, and a valve for effecting the equalization of fluid pressures on opposite sides of said piston, of a valve for venting fluid from said chamber to effect the movement of said piston and adapted in its closed position to open the valve for equalizing the fluid pressures on opposite sides of said piston.

6. In an empty and load brake, the combination with a valve mechanism having a movable abutment for controlling empty and load braking and manually operated means for effecting the adjustment of said valve mechanism, of a valve operated by said means for controlling communication from one side of said abutment to the other.

In testimony whereof I have hereunto set my hand.

WALTER V. TURNER.

Witnesses:
A. M. CLEMENTS,
W. W. MARTIN.

---

Copies of this patent may be obtained for five cents each, by addressing the "Commissioner of Patents, Washington, D. C."